March 4, 1958 — A. F. SEIBEL — 2,825,546
CONTROLLING MECHANISM FOR FURNACE FIRING EQUIPMENT
Filed Sept. 7, 1954 — 6 Sheets-Sheet 1
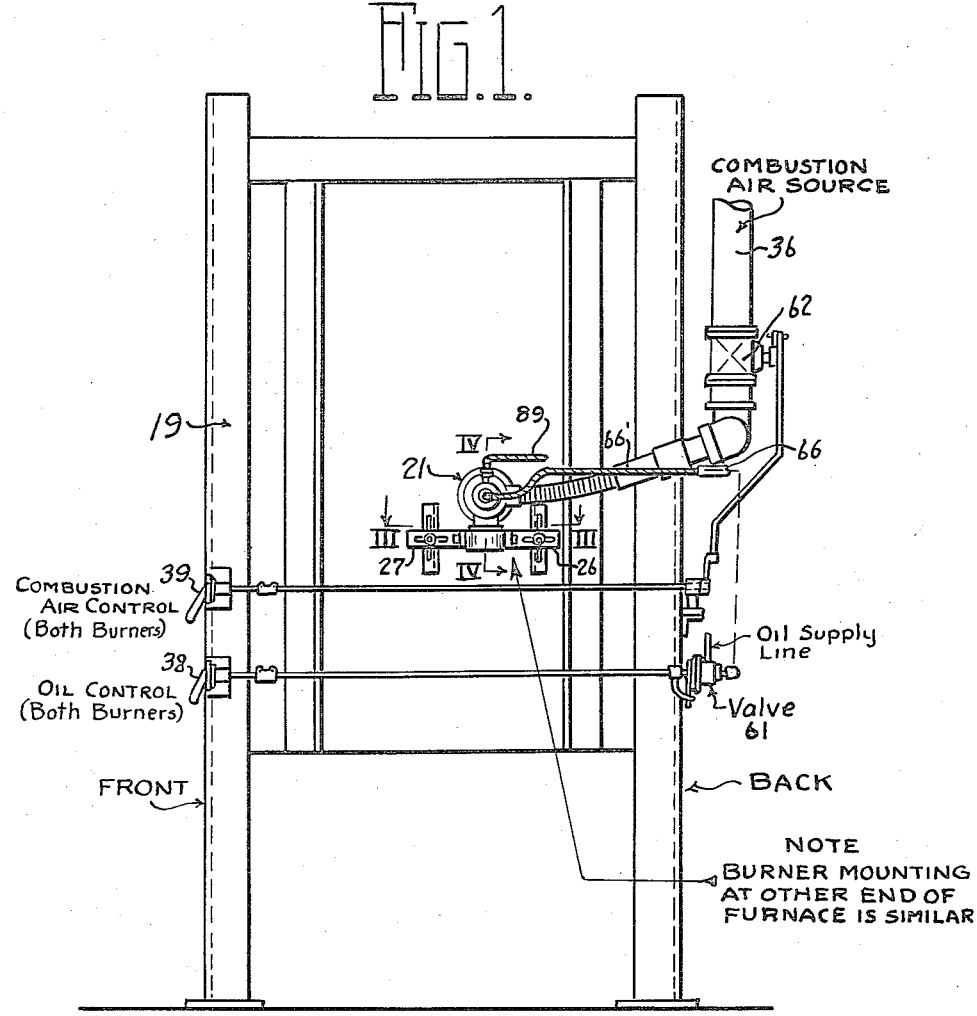
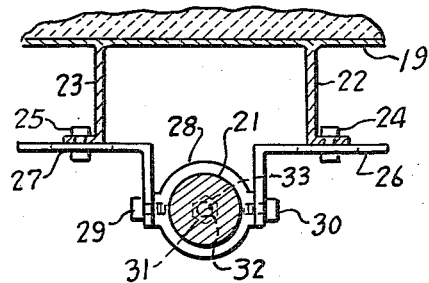
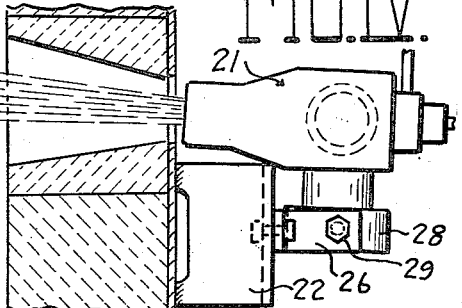
Alfred F. Seibel
Edmund B. Whitcomb
ATTORNEY

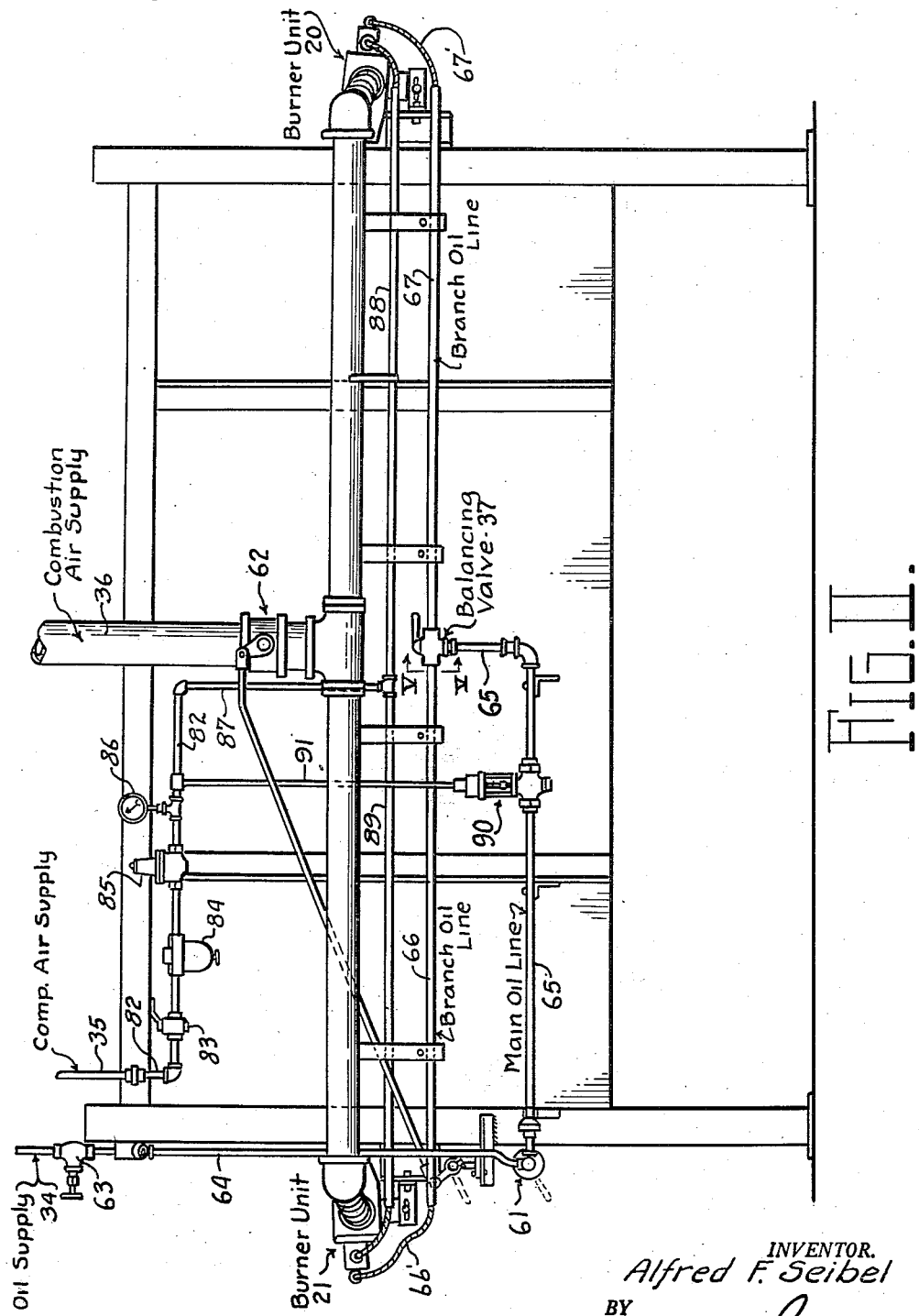

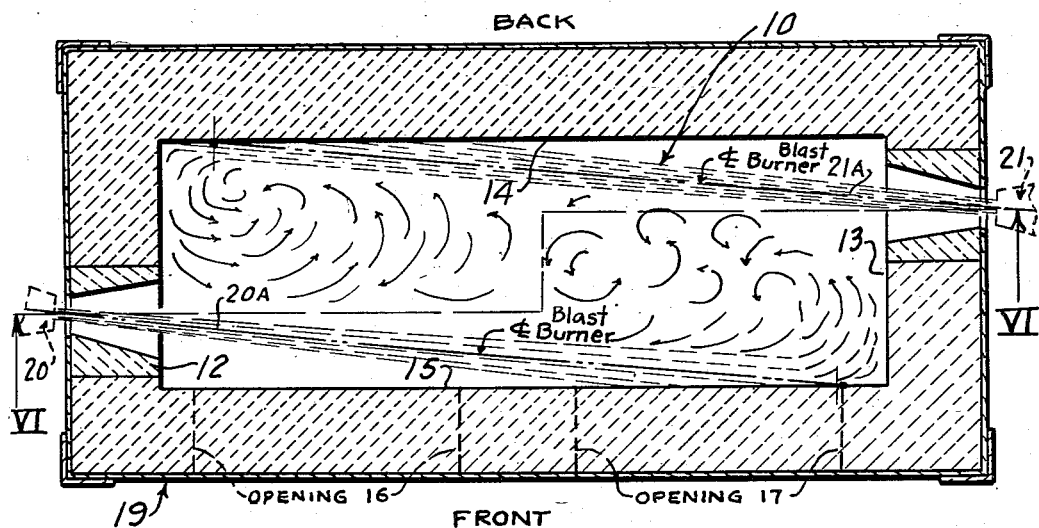
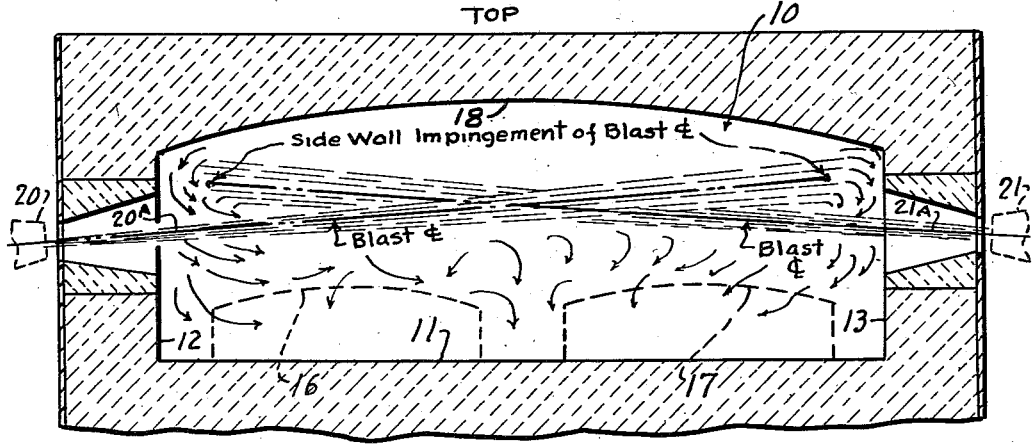

March 4, 1958  A. F. SEIBEL  2,825,546
CONTROLLING MECHANISM FOR FURNACE FIRING EQUIPMENT
Filed Sept. 7, 1954  6 Sheets-Sheet 4
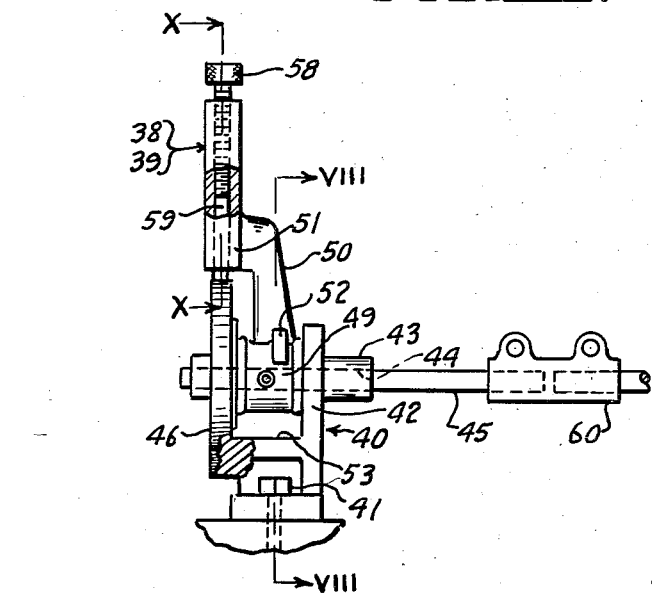
FIG. VII.
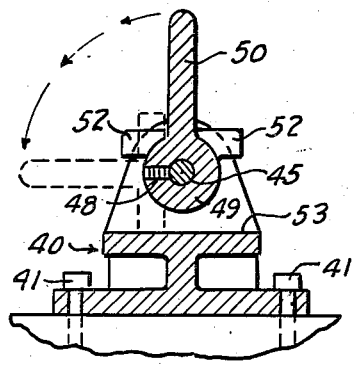
FIG. VIII.
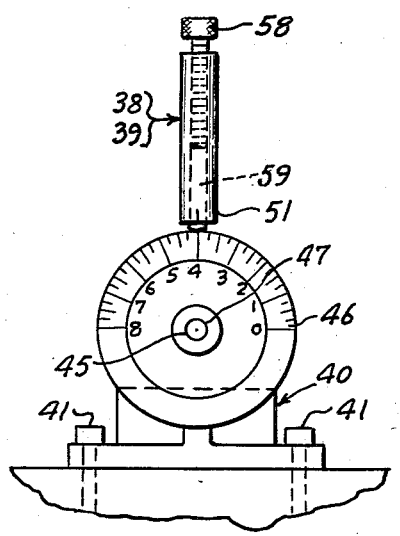
FIG. IX.
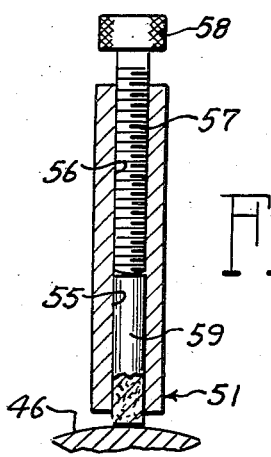
FIG. X.
INVENTOR.
Alfred F. Seibel
BY
Redmund B Whitcomb
ATTORNEY

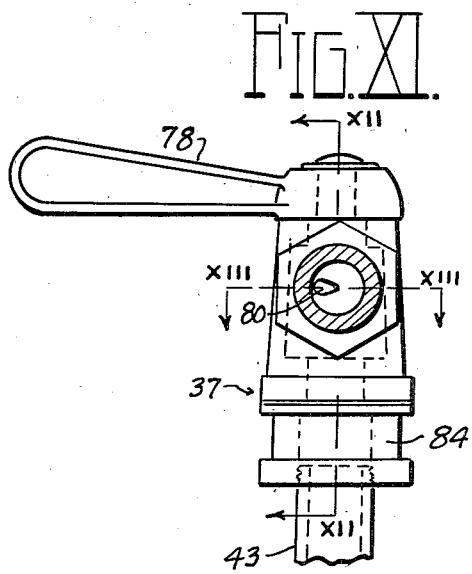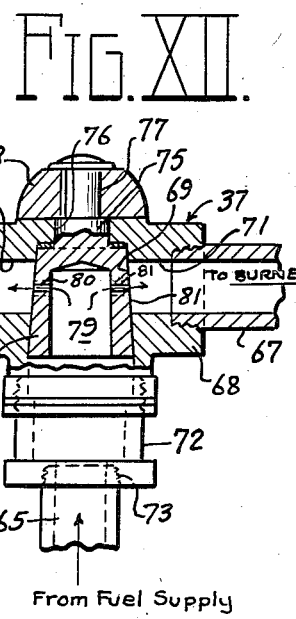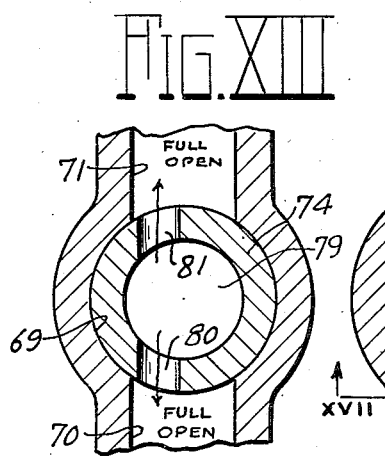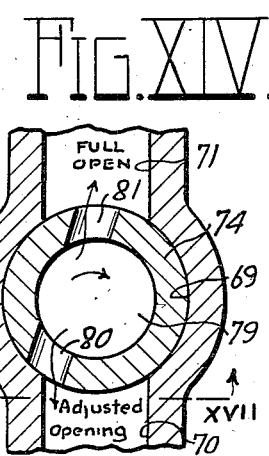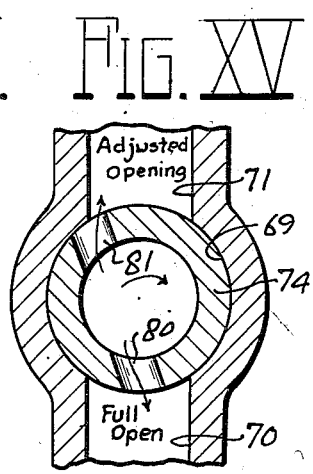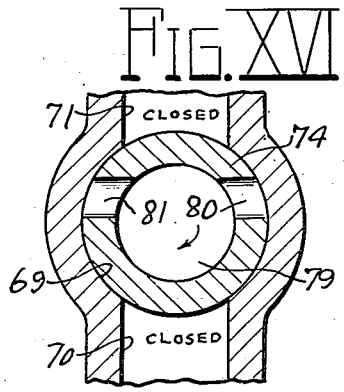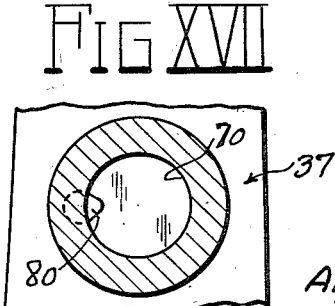

March 4, 1958     A. F. SEIBEL     2,825,546
CONTROLLING MECHANISM FOR FURNACE FIRING EQUIPMENT
Filed Sept. 7, 1954     6 Sheets-Sheet 6
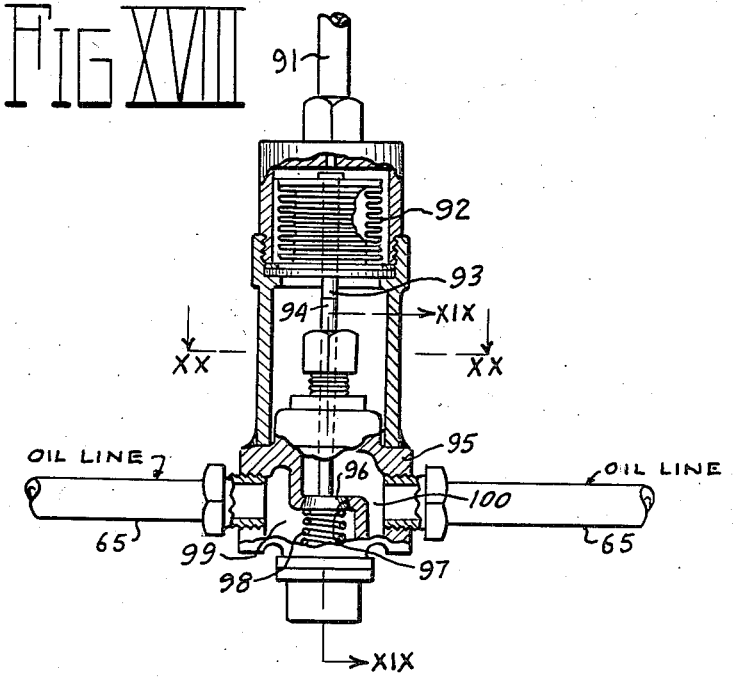
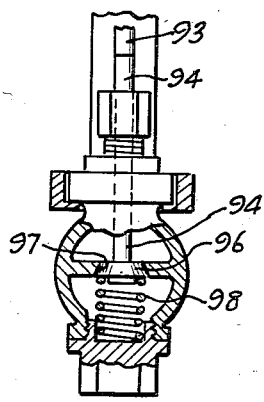
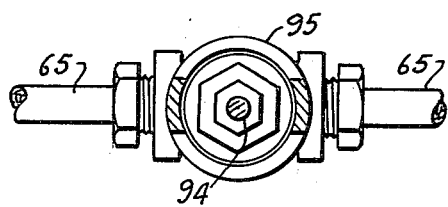
INVENTOR.
Alfred F. Seibel
BY
ATTORNEY United States Patent Office 2,825,546
Patented Mar. 4, 1958

2,825,546

CONTROLLING MECHANISM FOR FURNACE FIRING EQUIPMENT

Alfred F. Seibel, Toledo, Ohio

Application September 7, 1954, Serial No. 454,509

7 Claims. (Cl. 263—40)

This invention relates to oil or other fuel firing equipment for industrial furnaces, particularly adapted for treating metal such as used in drop forging and the like. The invention is particularly concerned with the fire producing equipment therefor, including the proper shape, configuration and construction of the furnace itself and the employment of a special type of burner unit such as disclosed in my copending application, Serial No. 393,633, now Patent No. 2,764,455, the present invention relating particularly to overall installation of the equipment in combination with said furnace and burner units involving the construction and arrangement of the supply lines for the fuel employed, the combustion air and other gaseous fluids used such as high compression air or steam, together with interconnected controls for extremely accurately balancing and regulating the equipment, the same being readily adjustable by the operator from a position adjacent the furnace openings, the equipment arranged to produce an extremely hot uniform highly turbulent flame or fire in the fire box of the furnace, thereby greatly increasing the overall efficiency in use and economy in the amount of fuel employed.

Further objects and advantages are within the scope of the invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure I is an end elevation of my improved furnace;

Figure II is a rear elevation of the same;

Figure III is a section taken on the line III—III of Figure I;

Figure IV is a section taken on the line IV—IV of Figure I;

Figure V is a horizontal section of the furnace showing diagrammatically the action of the flame in the fire box;

Figure VI is a sectional elevation of the same taken on the line VI—VI of Figure V;

Figure VII is an elevation, partly in section, of the remote control head for controlling the fuel supply and combustion air lines;

Figure VIII is a section taken on the line VIII—VIII of Figure VII;

Figure IX is a front elevation of the control head shown in Figure VII;

Figure X is a section taken on the line X—X of Figure VII;

Figure XI is an elevation, partly in section, of the balancing valve used to control the branch lines of the fuel supply;

Figure XII is a section taken on the line XII—XII of Figure XI;

Figure XIII is a transverse section taken on the line XIII—XIII of Figure XI, showing the balancing valve in full open position;

Figure XIV is a similar view showing the balancing valve in position to limit the flow in one of the branch lines;

Figure XV is a similar view showing the balancing valve in position to control supply to the other branch fuel line;

Figure XVI is a similar transverse view of the valve with the supply to the branch lines entirely cut off;

Figure XVII is a section taken on the line XVII—XVII of Figure XIV;

Figure XVIII is an elevation, partly in section, of the automatic control valve between the high pressure line and the fuel line;

Figure XIX is a section taken on the line XIX—XIX of Figure XVIII; and

Figure XX is a section taken on the line XX—XX of Figure XVIII.

In the present embodiment of my invention illustrated herein, the furnace includes the outside framework with the firing or heating chamber illustrated at 10. This chamber 10 is composed of or built up with suitable refractory material to withstand high temperatures and may be formed of suitable furnace bricks used for this purpose. The particular firing chamber of my invention illustrated herein has a rectangular floor 11, vertical left end wall 12 and right end wall 13, a rear wall 14 and a front 15, the latter provided with openings 16 and 17 through which the metal or metal pieces to be heated are inserted and removed from the interior of the furnace as is customary with the metal pieces resting on the floor during heating. The furnace 10 is provided with a relatively low arched ceiling 18 curved from one end wall to the other as shown in Figures V and VI. The furnace chamber 10, as indicated above, is located within and carried by a surrounding metal casing or metallic framework 19, the furnace itself being spaced above the floor of the building, as shown in Figure I. This facilitates insertion and withdrawal of metal pieces by the furnace operator who stands on the floor near the openings therein, here shown as located in front of the furnace.

By my invention, I provide a pair of oppositely arranged special burner units 20 and 21, unit 20 located in one end wall 12, as at the left, toward the front wall and the other burner 21 positioned in the other end wall 13 toward the rear wall in the particular installation here shown. In each case, I provide a special burner block of suitable furnace wall material constructed with a frusto-conical-shaped passage therethrough as shown. The axes of these passages through the burner block for each burner unit 20 and 21 are positioned at an angle of about 5 degrees vertically to the horizontal as shown by line 20A, Figure VI and at 20A in Figure V and directed toward the front by about five degrees. Likewise, the other burner block for burner 21, as shown by line 21A in Figure VI, is positioned at about five degrees vertically from the horizontal and as shown in Figure V, the axis of this frusto-conical opening through that burner block for burner 21 is directed rearwardly by about five degrees as shown by line 21A in Figure V. This arrangement cooperates with the special setting and aiming of the burner units 20 and 21 as herein set forth. Each burner unit is positioned above the floor 12 by a space as shown in Figure VI, dependent upon the size of the particular furnace which can accommodate various sizes of metal pieces to be inserted into the furnace to be heated. As stated above, these burners are of the special type illustrated in my copending application, Serial No. 393,633, filed November 23, 1953.

A special feature of my invention is in properly locating and aiming said burners 20 and 21 at such angles that the flames therefrom do not cross each other but direct long narrow flames issuing therefrom upwardly toward the opposite end of the furnace near the top, one flame preferably contacting against the front wall near the opposite end and ceiling, and the other against the rear wall, as indicated in Figure VI. In this way, I provide means to form a turbulent extremely hot mass of heating media (see Figures V and VI) and uniformly distribute the same throughout the entire interior of the furnace, the highly turbulent action of the flame resulting in forcing the heating media upon, around and between the metal pieces located on the floor 11. Thus, I provide two elongated flames projected from opposite ends of the furnace directed longitudinally and upwardly, said flames being parallel in a horizontal plane with one passing the other in spaced relation vertically of the furnace, the central zone of each flame arranged to contact its adjacent side wall at the opposite end near upper portion thereof. In fact, the heating mass of flame and combustible material completely enshrouds the metal and extends to, if not slightly outwardly through the openings 16 and 17 in the front wall of the furnace.

One means for supporting the burners 20 and 21 on the furnace consists of a pair of angle supports 22 and 23 welded or otherwise secured to the furnace, a pair on each opposite end thereof, each having vertical slots 24 and 25 in the vertical outer flanges of said supports to which angle brackets 26 and 27 may be adjusted and set in a desired position by suitable locking bolts and nuts as shown. These brackets 26 and 27 also have horizontal slots therein, as shown, so that said adjusting bolts and nuts lock said supports in both vertical and horizontal position. A pivoted circular base member or cradle 28, one carrying each separate burner unit 20 or 21 is pivoted by cap screws 29 and 30, as shown, to said brackets 26 and 27 (see Figure III). By this construction, the longitudinal axis of each burner 20 and 21 may be tilted vertically at the desired and proper angle. In order to swing horizontally and set in position each of said burner units, I provide in the base member or cradle 28, a cap screw 31 passing through an opening 32 in the base member 28 and screwed into the bottom of the burner units 20 and 21. By unloosening the cap screw 31 from the bottom, said units may be rotated horizontally and upon screwing up on cap screw 31, the head 33 thereof locks the burner units in desired position horizontally. By properly setting the other set of pivots in the cap screws 29 and 30, the burner units may be given and locked in the proper vertical angle. In this manner, the burner may be aimed in this particular type of installation as desired to project a long flame from each burner from opposite ends of the furnace as stated above.

It is noted that the slotted supports 22 and 23 as well as the slotted brackets 26 and 27 for mounting the burner units 20 and 21 also serve the purpose of permitting proper installation of the units 20 and 21 when, for example, a new or different "burner block" is located in a furnace, since these slotted supports 22 and 23 and brackets 26 and 27 permit the burner units 20 and 21 to be bodily adjusted vertically and horizontally in addition to the adjustment of the cradle or base member 28, as above set forth and still maintain the correct angular setting of the burner units.

In conjunction with the foregoing improved furnace construction and flame injection means, my present invention also involves in cooperation therewith the accurately controlling and setting in fixed positions of the various supply connections of the fluids used in my equipment, with certain definite and accurate adjustable controls therefor, as will hereinafter more fully appear, including an interconnected automatic shut-off valve for the fuel line for safety purposes. Thus, I provide from a suitable source, a fuel, such as oil supply line 34, a high pressure air or steam mixing, injecting and vaporizing media therefor through the inlet supply line 35, as well as the low pressure or combustion air main inlet supply pipe 36.

Broadly, to this end, I provide, in addition to the accurate control and regulation of the high pressure air stream or other vaporizing media (supply line 35) a special balancing valve 37 for equalizing fuel supply to both burners as well as a remote control at the front of the furnace for the fuel for both burners. I also provide in the combustion air supply line, a remote control therefor and place the operating remote control head 38 for the fuel and head 39 for the combustion air at the right-hand front corner of the furnace in the particular embodiment herein illustrated and as shown in Figures I and II (on the side of the openings 16 and 17) so that the controls may be readily actuated and set in proper adjustment by the operator of the furnace, all as will hereinafter be more fully set forth.

In order to provide a very accurately settable and controllable means constituting these two remote control heads or adjustable means in the handles 38 and 39, I show, in Figures VII to X, the details of a satisfactory construction therefor.

To this end, I provide a member 40 adapted for attachment to the framework of the furnace by means of bolts 41. The member 40 is provided with an end wall 42 formed with a boss 43, the wall and boss being bored as at 44 to receive the end of a stub shaft 45.

A graduated dial member 46 is fixedly attached to the member 40, or may be cast integral therewith, and this dial member is also bored as at 47 to receive the end of the stub shaft 45, the same being fully rotatable in the bores of the boss 43 and the dial. Mounted on the shaft 45 and fixed thereto as by set screw 48, I provide the handle and locking heads or means 38 and 39, these being identical for each member 38 and 39 and, as particularly shown in Figure VIII, are made up of a central boss 49 around shaft 45, an extending arm 50, and a handle portion 51. The boss 49 is also provided with extending wings 52, these being adapted to selectively abut a stop surface 53 on the bracket 40 upon rotation of the member 54 into extreme positions in either direction.

I provide in the handle 51 a locking means including a bore 55, partially threaded as at 56 to receive a screw 57 having a knurled head 58. A woodfiber or other suitable contact member 59 is mounted in the lower end of the bore 55 against the inner end of the screw 57 and adapted to be moved thereby. As particularly shown in Figures VIII and XI, I mount the center of the handle member 51 directly over the periphery of the fixed dial 46, and in such a manner that the contact member 59 may be moved down by the screw 57 to contact the circumferential surface of the dial member 46, whereby to lock the handle member 51 in any selected position.

I also provide suitable couplings 60 for attaching the stub shafts 45 to the shafts leading to the fuel valve 61 and the combustion air valve 62. In this manner, the positions of both these valves may be accurately set and locked by the remote control heads and control means designated as 38 and 39.

Referring to the overall arrangement more in detail, as shown in Figure II, the main fuel supply pipe line 34 is located, in this particular embodiment, at the rear upper right-hand corner of the furnace, or, as may be desired, in various other installations, and I provide a preliminary main line valve 63 and through downwardly extending pipe 64, the fuel supply is connected to valve 61 controlled and set by remotely positioned head 38, referred to supra. Moreover, I provide in the fuel supply pipe 65, between the main oil valve 61 and the balancing valve 37, the automatic oil shut-off valve 90, hereinafter described. Hence, a pipe 65 connects the same with the balancing valve 37 from which two branch pipe lines 66 and 67 connect to the burner units 20 and 21, by flexible connectors 66' and 67', as shown.

For one special embodiment of a suitable balance valve 37 to be adjusted and set in fixed position, I have shown, in Figures XI–XVII, detailed views of such a construction. For example, the valve 37 has a casing 68 provided with a frusto-conical bore 69 and connected with laterally extending ports 70 and 71. The lower part of the casing 68 is threaded to receive a short nipple 72 which is also threaded as at 73 to receive the end of the fuel supply pipe 65. In the bore 69, I mount a rotatable valve plug 74 with a vertically extending stem 75 passing through an opening 76 in the top of the casing 68, said stem being reduced in diameter as at 77 for suitable attachment to a valve operating handle 78.

The valve plug 74 has a central bore 79 in communication through the nipple 72 with the fuel supply pipe 65 and is also provided with lateral tear drop shaped ports 80 and 81 in communication with the central bore 79 and adapted to register with the ports 70 and 71 in the casing 68 in various positions as required in the operation of the valve 37. The action of the ports 80 and 81 is illustrated in the enlarged sections, Figures XIII–XVI, while the shape of the ports is shown in the vertical section, Figure XVII. It will be noted that the ports 80 and 81 are not centrally bored with reference to the valve plug 74, but are offset from the center line to permit the adjustments as shown in Figures XIV and XV, where is will be seen that while one port remains fully open, the other can be infinitely varied in port area, the tear drop shape of the ports enabling the port areas to be reduced to an extremely small opening at the point of the tear drop, which is directed toward the center of the valve, as shown in Figures XI and XVII.

It will thus be seen that an extremely accurate balanced relationship can be effected between the amounts of fuel admitted through the valve 37 to the pipes 66 and 67 and thence to the opposite burner units 20 and 21, this relationship being set as required to produce the maximum efficiency for use in my improved furnace and may be varied for different operating requirements.

Figure II also shows the high pressure air supply system, as indicated above, may involve the use of other media such as steam, gas, etc. Thus, I provide the main high pressure inlet air line 35, a transverse line 82 at the rear of the furnace 10, said line 82 having a suitable cutoff valve 83, filter 84, pressure regulator 85 and gage 86 therein, whereby the high pressure media supplied may be controlled and set for a desired requirement and manitained fixed at about 45 pounds pressure for certain desirable installations. The transverse pipe 82 is connected to the downwardly extending vertical line 87 with branches for the high compression air, one branch 88 for burner unit 20 and the other branch 89 for unit 21, both connected to the burner units through flexible connectors similar to the fuel connectors 66' and 67'.

As shown in Figure II, I also provide in the present invention, means for intercontrolling the action of the high pressure air or steam line with the supply of fuel to the burners so that unless there is a proper pressure in the supply of high pressure air or steam used, no oil or fuel will be supplied to my firing equipment. Thus, between the high pressure air line 82 and the fuel (oil) line 65, I interpose such an automatic control in the automatic oil shut off valve 90 connected to be controlled by the pressure in line 82 through pipe 91. The details of this valve 90 are shown in Figures XVIII to XX, where it will be seen that connected with the pipe 91 is a bellows 92 so that the pressure within the same corresponds to the pressure adjacent the gage in the high pressure supply line 82. Connected with this bellows so as to be operated thereby is a depending pin 93 adapted to contact the upper end of a valve stem 94. This valve stem extends downwardly into the valve housing 95 and carries a valve 96 adapted to seat against a seat 97 in the valve housing 95. A coil spring 98 is positioned as shown in the bottom of the valve to constantly urge the valve into seating position.

It will be seen that the passages 99 and 100 connect on opposite sides of the fuel supply line 65 and that by the passages indicated inside the housing, the valve 96 controls the passage of fuel therethrough. If pressure in the high pressure supply line 82 falls below a predetermined minimum, the spring 98 will close the valve 96, since the pressure in the bellows 92 derived from the high pressure supply line 82 holds the valve open by the pin 93, all contacting the end of the valve stem 94.

In operation, the balancing valve 37 is properly adjusted and set for efficient operation for a given furnace. The same applies to valve 83 for the high pressure air, steam, or other media used herewith. However, the two regulating heads 38 and 39, I provide for controlling the fuel supply and supply of combustion medium actually entering each burner unit 20 and 21 as may be necessary for best operation of the furnace by the operator and these two control heads 38 and 39 are, as stated above, located adjacent the furnace openings 16 and 17 so that the operator may readily adjust the fire within the furnace to suit the actual operating conditions prevalent, and lock the same temporarily in the correct position. For satisfactory operations, I have found for certain furnaces that a pressure of 40 to 50 pounds for the high pressure line has been desirable and clogging of the passages avoided. The air or other combustion medium I have operated under about 15 pounds pressure.

It is apparent that, within the scope of the invention, modifications and different arrangements may be made other than is herein disclosed, and the present disclosure is illustrative merely, the invention comprehending all variations thereof.

What I claim is:

1. In a heating furnace for heating metal to high temperatures in which means are provided for inserting metal to be heated and removing the heated metal therefrom, a combustion chamber having an elongated floor, upright side and end walls and a ceiling arched in a longitudinal direction, said chamber having a refractory inner surface; a pair of opposed burner units, one located adjacent each opposite end wall of said combustion chamber, burner blocks having openings therethrough located in said end walls of said chamber, said opposed burner units positioned on said furnace adjacent said burner blocks and aimed to inject a turbulent uniformly distributed heating flame into said chamber around said metal to be heated, said flame passing through said burner blocks, means to supply fuel and combustion supporting gaseous medium to said burner units to form said flame; single manually operable valve means to set and simultaneously control the supply of fuel to both burner units; means separate from said fuel valve means to simultaneously control supply of said combustion supporting gaseous medium to both said units; and means to adjust said burner units whereby each directs an elongated flame into said chamber from opposite ends, to contact the adjacent side walls adjacent the opposite end wall and near said arched ceiling whereby the heating media injected into said furnace is turbulently mixed and distributed onto and around said metal to be treated in said furnace producing a maximum uniform high temperature.

2. In a heating furnace for heating metal to high temperatures in which openings are provided for inserting and removing metal to be heated, a combustion chamber having a rectangular floor, upright side and end walls and a ceiling arched in a longitudinal direction, said chamber having a refractory inner surface; a pair of opposed burner units, one located adjacent each opposite end wall of said combustion chamber, said burners adapted to inject a heating flame into said chamber through inlet burner blocks located in said end walls; a main fuel supply pipe located adjacent a wall of said furnace; branch fuel supply pipes from said main fuel supply pipe to each burner unit; means to supply a combustion supporting gaseous medium to said burner units to form said flame; an adjustable balancing valve means to adjust and set the supply of fuel to each burner unit; means to simultaneously control supply of said combustion medium to both said units; means to adjust said burner units whereby each directs an elongated flame into said chamber from opposite ends, to contact the adjacent side wall spaced from the opposite end wall and adjacent said arched ceiling whereby said flames are turbulently mixed to produce a maximum uniform high temperature throughout said heating portion of said chamber; and another fuel control valve located in said main fuel supply line to simultaneously control passage of fuel to both said branch pipe lines; a linkage for controlling said last-mentioned valve and extending to the side of said furnace adjacent the furnace openings; and a single handle located at the front of said furnace for regulating and setting said valve through said linkage.

3. In a heating furnace for heating metal to high temperatures in which openings are provided for inserting and removing metal to be heated, a combustion chamber having a rectangular floor, upright side and end walls and a ceiling arched in a longitudinal direction, said chamber having a refractory inner surface; a pair of opposed burner units, one located adjacent each opposite end wall of said combustion chamber, said burners adapted to inject a heating flame into said chamber through inlet burner blocks located in said end walls; a main fuel supply pipe located adjacent a wall of said furnace; branch fuel supply pipes from said main fuel supply pipe to each burner unit; a manually adjustable and settable balancing valve located at the union of said main fuel supply pipe and said branch fuel supply pipes, said valve being adapted to control the amount of fuel supplied to each of said burners through said branch pipes from said fuel supply pipes; means to supply a combustion supporting gaseous medium to said burner units to form said flame; means to simultaneously control supply of said combustion medium to both said units; means to adjust said burner units whereby each directs an elongated flame into said chamber from opposite ends and contact the adjacent side wall near the opposite end and adjacent said arched ceiling whereby said flames are turbulently mixed ot produce a maximum uniform high temperature throughout said metal heating portion of said chamber; and another fuel control valve located in said main fuel supply line to control passage of fuel through said main pipe to both said branch pipe lines; a linkage for controlling said last-mentioned valve and extending to the front side of said furnace adjacent the furnace openings; and a single handle located at the front of said furnace for regulating and setting said valve through said linkage.

4. In a heating furnace for heating metal to high temperatures in which means are provided for inserting and removing metal to be heated, a combustion chamber having a rectangular floor, upright side and end walls and a ceiling arched in a longitudinal direction, said chamber having a refractory inner surface; a pair of opposed burner units, one located adjacent each opposite end wall of said combustion chamber, said burners adapted to inject a heating flame into said chamber through inlet burner blocks located in said end walls; a main fuel supply pipe located adjacent the rear wall of said furnace; branch fuel supply pipes from said main fuel supply pipe to each burner unit; piping means to supply a combustion fluid to said burner units to form said flame; an adjustable balancing valve to adjust the supply of fuel to both burner units; means to simultaneously control supply of said combustion fluid to both said units; means to adjust said burner units whereby each directs an elongated flame into said chamber from opposite ends, to contact the adjacent side wall spaced from the opposite end wall and adjacent said arched ceiling whereby said flames are turbulently mixed to produce a maximum uniform high temperature throughout said heating portion of said chamber; and a manually controlled valve located in said main fuel supply line to simultaneously control passage of fuel from the main supply to both said branch pipe lines; a valve in said combustion fluid supply line; manually operable remote control heads for adjusting and setting said last-mentioned valves, said heads located at the front of said furnace adjacent said metal insertion means; and separate linkages extending between said heads to said valves.

5. In a heating furnace for heating metal to high temperatures, a combustion chamber having a rectangular floor, side and end walls and a ceiling arched in a longitudinal direction, said chamber having a refractory inner surface, a pair of opposed burner units, one located adjacent each opposite wall of said combustion chamber, said burners adapted to inject a heating flame into said chamber through inlet burner blocks located in said end walls; a main fuel supply pipe located adjacent the rear wall of said furnace; branch fuel supply pipes from said main fuel supply pipe to each burner unit; means to control the flow of fuel through said main fuel supply line, and manually settable adjustable control means for adjusting the amount of fuel received by each burner from each of said branch fuel supply lines, said means comprising a valve structure in communication with said main fuel supply line and each of said branch lines; a manually rotatable and settable hollow valve plug therein, carrying a pair of eccentrically located tear-drop shaped ports, said ports adapted to register with the valve openings into said branch fuel lines, whereby fuel from said main fuel line can be admitted to either or both of said branch lines, said tear-drop-shaped openings being adapted to provide a maximum valve opening into either of said branch lines, while the opening into the other branch may be adjusted from zero to a maximum amount.

6. In a heating furnace for heating metal to high temperatures in which means are provided for inserting metal to be heated and removing the heated metal therefrom, a combustion chamber having a rectangular floor, upright side and end walls and a ceiling arched in a longitudinal direction, said chamber having a refractory inner surface; a pair of opposed burner units, one located adjacent each opposite end wall of said combustion chamber, burner blocks located in said end walls of said chamber, said opposed burner units positioned adjacent said burner blocks and aimed to inject a turbulent uniformly distributed heating flame into said chamber around said metal to be heated, said flame passing through said burner blocks, means to supply fuel and low pressure combustion fluid to said burner units; valve means to set and control both the supply of fuel and low pressure fluid to both burner units; means to supply a high pressure gaseous medium to both burner units; an interconnected pressure controlling passage between said high pressure line and said main fuel supply line; an automatic cut off valve in said main fuel supply line; and means connected with said valve for cutting off said main fuel supply upon the lowering of said pressure in said high pressure line below a predetermined minimum.

7. In a heating furnace for heating metal to high temperatures in which means are provided for inserting metal to be heated and removing the heated metal therefrom, a combustion chamber having a rectangular floor, upright side and end walls and a ceiling arched in a longitudinal direction, said chamber having a refractory inner surface; a pair of opposed burner units, one located adjacent each opposite end wall of said combustion chamber, burner blocks having openings therethrough located in said end walls of said chamber, said opposed burner units positioned on said furnace adjacent said burner blocks and aimed to inject a turbulent uniformly distributed heating flame into said chamber around said metal to be heated, said flame passing through said burner blocks, means to supply fuel and combustion supporting gaseous medium to said burner units to form said flame; means adapted to inject at high pressure a relatively fixed inactive gaseous medium into the center of said flame; means adapted to surround said flame with an envelope composed of another gaseous medium; single manually operable valve means to set and simultaneously control the supply of fuel from the main supply to both burner units; means separate from said fuel valve means to simultaneously control supply of said combustion supporting gaseous medium to both said units; and means to adjust said burner units whereby each directs an elongated flame into said chamber from opposite ends, to contact the adjacent side walls near the opposite end wall and adjacent said arched ceiling whereby the heating media injected into said furnace is turbulently mixed whereby a maximum uniform high temperature is produced around said metal to be treated in said furnace.

References Cited in the file of this patent

UNITED STATES PATENTS

| | | |
|---|---|---|
| 635,229 | Burin | Oct. 17, 1899 |
| 707,104 | Halley | Aug. 19, 1902 |
| 1,004,200 | Regan | Sept. 26, 1911 |
| 1,305,034 | Tripp et al. | May 27, 1919 |
| 1,879,494 | Remmey | Sept. 27, 1932 |
| 2,478,190 | Guthrie | Aug. 9, 1949 |
| 2,486,070 | Smith | Oct. 25, 1949 |